United States Patent [19]

Herchenbach et al.

[11] Patent Number: 4,619,605
[45] Date of Patent: Oct. 28, 1986

[54] METHOD FOR THE THERMAL TREATMENT OF CALCAREOUS MINERAL RAW MATERIALS

[75] Inventors: Horst Herchenbach, Hennef; Hubert Ramesohl, Bergisch Gladbach, both of Fed. Rep. of Germany

[73] Assignee: Klöckner-Humboldt-Deutz AG, Fed. Rep. of Germany

[21] Appl. No.: 681,598

[22] Filed: Dec. 14, 1984

[30] Foreign Application Priority Data

Dec. 14, 1983 [DE] Fed. Rep. of Germany ....... 3345166
May 19, 1984 [DE] Fed. Rep. of Germany ....... 3418685

[51] Int. Cl.⁴ .............................................. F27B 15/00
[52] U.S. Cl. ..................................... 432/14; 432/106; 110/347
[58] Field of Search ............................ 432/106, 58, 14; 110/347

[56] References Cited

U.S. PATENT DOCUMENTS

| | | | |
|---|---|---|---|
| 3,794,565 | 2/1974 | Bielski et al. | 432/106 |
| 3,925,091 | 12/1975 | Yoshida et al. | 432/106 |
| 4,226,585 | 10/1980 | Deussner | 432/58 |
| 4,236,887 | 12/1980 | Heian | 432/106 |
| 4,310,298 | 1/1982 | Abelitis | 110/347 |
| 4,315,734 | 2/1982 | Ramesohl et al. | 432/106 |
| 4,329,180 | 5/1982 | Herchenbach | 432/106 |
| 4,363,668 | 12/1982 | Herchenbach | 432/14 |

Primary Examiner—Henry C. Yuen
Attorney, Agent, or Firm—Hill, Van Santen, Steadman & Simpson

[57] ABSTRACT

A method for the thermal treatment of mineral raw materials containing calcium carbonate and similar carbonates, particularly for the production of calcined products such as burnt lime, cement, magnesite, dolomite or the like wherein the raw material carriers of the calcium or other carbonate constituents are supplied to the calcining unit with a particle size of from 1 mm to 25 mm. The calcareous constituents are preferably supplied to the calcining unit with a particle size from 1 mm to 4 mm. To achieve this condition, the raw material containing the calcareous constituents is preferably pre-crushed to a particle size below 200 mm and pre-homogenized. It is then supplied to a drying comminution system connected to the calcining unit at the gas side and is suspended therein in direct heat exchange relationship with the gases. The material is preferably processed by means of single-stage crushing and grading to form the appropriate particle size. The upper limit of the grain size is determined by the amount of free lime content or of the ignition loss of the calcined product to the extent that the limit is lowered with a high free lime content or a high ignition loss.

8 Claims, 1 Drawing Figure

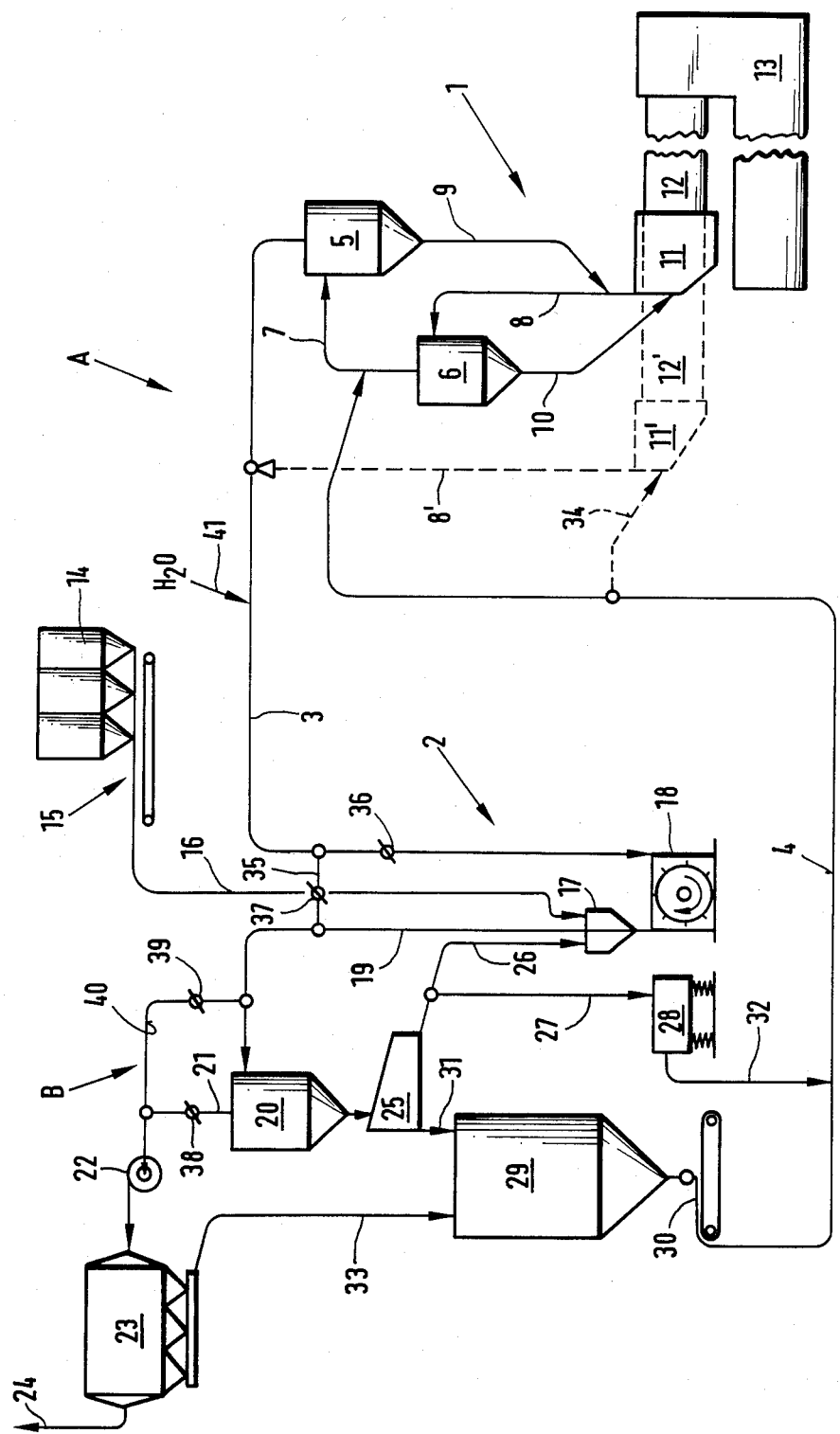

METHOD FOR THE THERMAL TREATMENT OF CALCAREOUS MINERAL RAW MATERIALS

BACKGROUND OF THE INVENTION

1. Field of the Invention

The present invention relates to the thermal treatment of calcareous mineral raw materials and/or mineral raw materials containing other carbonate constituents, particularly for the manufacture of calcined products such as burnt lime, cement, magnesite, dolomite and the like. The raw materials are preheated in zone fashion, first in a preheating zone in direct heat exchange with suspending hot gases from a calcining section, are calcined in the calcining section, and then sintered as required and finally cooled in a cooling zone.

2. Description of the Prior Art

It is standard procedure to employ feed material in the form of raw meal when calcining mineral-type raw materials of the type previously mentioned containing carbonate constituents in a calcining aggregate, particularly one having a suspension-type preheater.

One of the main reasons for this approach is that the heating time of the mineral particles in the gas stream significantly depends on the particle size as shown in the diagram and explained in the text in the publication "Zement-Data-Book" by Duda, Bauverlag GmbH, Wiesbaden and Berlin, 2nd Edition, 1977, page 381, FIG. 20.3.

To take an example, the transit time of a raw material particle with a fineness between 0.1 and 0.2 mm through a four-stage cyclone heat exchanger having a height of approximately 50 meters amounts to about 50 seconds from the time the raw material is admitted up until it reaches the rotary kiln intake. Raw meal is heated from about 50° C. to about 800° C. during this transit time, and the ascending kiln gases are cooled from about 1100° C. to about 330° C. The gas and the material rate in the ascending conduits amounts to about 20 to 22 meters per second. Due to this good and spontaneous heat transmission effect, previous efforts have been directed at delivering the material to be calcined to the system at a meal fineness at which about 100% is less than 200 microns.

It is known from the same aforementioned publication according to Chapter 5.1 entitled "Mahlung in der Zementerzeugung" that about 85% of the energy to be expended for the calcining material is involved in the grinding and comminution of the raw material, and that 75% of that amount is involved in the grinding of the raw material and of the clinker.

SUMMARY OF THE INVENTION

The present invention seeks to save or at least significantly reduce an essential part of the energy to be expended in the thermal treatment of calcareous mineral raw materials and/or mineral raw materials containing other carbonate constituents, particularly for the manufacture of calcined products such as burnt lime, cement, magnesite, dolomite and the like and, in particular, that energy which is used in the grinding of the mineral raw materials as well as to save or at least significantly reduce the outlay for apparatus required therefor, including the corresponding capital and operating costs, for example, for a grinding system.

In general, the method of the present invention involves controlling the grain size of the calcareous and/or other carbonate constituents of the raw material which are delivered to the preheating zone to a particle size of from 1 mm up to 25 mm. It is surprising that such departure from a heretofore fixed rule of procedure which required using the raw materials in the form of raw meal, that an excellent final product is produced, as well as the additional advantages of significantly reducing the costs for energy and apparatus outlay that must be expended. This surprising result apparently is based on the phenomenon that was not hitherto adequately considered in that limestone disintegrates or bursts in the heat when it is relatively rapidly heated to temperatures resulting in modification of the structure of the crystal lattice, leading to the expulsion of the water of crystallization and subsequently to the expulsion of carbon dioxide. Otherwise, it would be difficult to find an explanation for the fact that despite the delivery of the calcareous mineral constituents in individual piece sizes up to 25 mm, a calcined product such, for example, as high-grade clinker is produced by means of alite formation from the uniform melt phase as are burnt lime, magnesite, dolomite and similar calcined products. It is thus a part of the present invention that there is a recognition of the physical relationships taking place and exploiting them for a more economical manufacture of the calcined products.

One of the preferred embodiments of the method provides that the calcareous constituents are admitted to the calcining unit with a particle size of from 1 mm up to 4 mm. Production costs are decreased, as the grinding of the calcareous constituents is significantly reduced and thus energy and apparatus outlay are also reduced in the manufacture of the calcined products.

It was also found that the permissible size of the grain size depends at least to a considerable degree on the quality of the natural deposit, particularly of the limestone or the clay constituent. This obviously is involved in the different behavior of the initial material upon thermal decomposition.

In a further improvement, the method provides that the raw material mix with its calcareous mineral constituent is pre-crushed in its pit-wet condition to an individual grain size below 200 mm and, after pre-homogenization, is supplied as the initial material to a drying comminution system connected to the calcining unit and is comminuted therein into a pourable product, dried in the stream of hot gas taken from the calcining system, and supplied to the calcining system.

It was also surprisingly found that there is a relationship between the proper grain size and, for example, the free lime content in the calcined clinker or the ignition loss in the burnt lime produced. It was found that the free lime content or the ignition loss increases with the grain size. Consequently, it is further proposed in accordance with the present invention that the upper limit of the grain size of the raw material be adjusted in accordance with the measure of the free lime content in the calcined clinker or according to the amount of ignition loss in the burnt lime. The limit of particle sizes is thus lowered with increased free lime content.

Another improvement consists in adjusting the mean arithmetic grain size of the particles being introduced in accordance with the ignition loss in the calcined product. This, for example, can be accomplished in an advantageously simple fashion by subjecting the crushed product to a multi-stage screening classification.

In order to produce an optimum feed material with as low as possible outlay for energy and apparatus using raw materials having constituents which differ in their comminution behavior, in one form of the present invention, different grades of raw material constituents are separately comminuted and separately stored, to be supplied to the calcining system either individually or as a mixture. In this connection, a part or a constituent of the product ground to the fineness of meal can be added to the comminuted product.

The energy-saving comminution of the initial material for adjusting particle size in the present invention is preferably realized by employing an impact crusher. Particularly in the case of brittle material, the goal of reducing comminution energy as well as apparatus outlay is optimally achieved. With brittle comminution material, impact comminution has the advantage of a relatively high deqree of comminution between 1:50 and 1:80 with a relatively low specific work requirement of, for example, 3 kWn per ton of crushed product. The proportion of fine and superfine product in the comminuted product is also relatively high.

Depending on the comminution behavior of the raw material mixture, the materials can also be comminuted with substantial advantage by means of employing a roll-type crusher or a hammer mill.

In order to preserve the crusher tools from excessive wear, it is further provided in the present invention that oversize particles having a hard mineral constituent such as flint, granite, quartz or the like can be concentrated into a fraction and ground to a fine material and added to the granular material being processed as a mineral meal.

The present invention achieves its greatest possible advantage when naturally occurring mineral materials, the so-called natural cement such as, for example, pozzuolana, are contained in at least a part of the raw material.

The essential advantage of the invention derives overall from the fact that the granularly comminuted material is supplied to the calcining unit without the hitherto required grinding into raw meal and thus there is a significant energy savings.

BRIEF DESCRIPTION OF THE DRAWING

The single FIGURE of the drawing represents a block diagram of a typical system utilizing the improvements of the present invention in a cement calcining system.

DESCRIPTION OF THE PREFERRED EMBODIMENTS

The single FIGURE in the drawing is essentially a block diagram composed of a system generally labeled A comprising a calcining unit 1 and a system 2 comprising a unit for the comminution and drying of the initial material to form a suitable material for delivery to the calcining unit 1. The system portions A and B are connected to one another by a gas conduit 3 leading from the calcining unit 1 to the comminution and drying unit 2 and by a conveyor means 4 for charging material leading from the comminution and drying unit 2 to the calcining unit 1 and are thus functionally integrated.

In the embodiment shown in the solid lines, the calcining unit 1 comprises two cyclone heat exchangers 5 and 6 disposed one above the other. These form the preheater stage of the calcining unit 1. They are connected to one another in a known fashion by means of conduits 7 and 8 which carry exhaust gases as well as by a pair of material conduits 9 and 10. The material conduit 10 conducts preheated and partially calcined product into the inlet housing 11 of a rotary tubular kiln 12. The latter is followed at its discharge side by a cooler 13. In the embodiment shown with broken lines, the calcining unit comprises an inlet zone 11' of a long rotary tubular kiln 12' having preheating, calcining and clinker zones.

The system labeled B comprises a multi-cell raw material hopper 14 having a metering discharge means 15 for the formation of a mixture of initial materials from a plurality of constituents. This mixture is supplied to an impact crusher 18 by means of a conveyor means 16 through an admission lock 17. The admission takes place at the foot of a flow drier 19 connected to the impact crusher 18, the flow drier being traversed by hot gas from the calcining unit 1 as is the impact crusher 18. The initial material is already pre-dried during the admission into the impact crusher 18 by means of the admission lock 17 and is then further intensely dried during the comminution and subjected to an intense drying after comminution during transport in the stream of hot gas through the flow drier 19 from the impact crusher 18 up to the separator 20. The separator 20 separates comminuted material from the hot stream of carrier gas. Exhaust gas is sucked in by a ventilator 22 by means of a conduit 21 and is discharged through a dust filter 23 to a stack (not shown) as shown by the arrow 24. Oversize particles are separated from the comminuted material in a grading means 25. The oversize particles are returned to the impact crusher 18 for renewed comminution with the conduit 26 by means of the admission lock 17. In case an undesirably hard constituent such as flint, granite, basalt and the like is concentrated in the oversize particle, this can either be eliminated from the comminution system or can be supplied by the conduit 27 to a small grinding unit, for example, a vibratory grinding mill 28 for grinding for further comminution. The finished product is discharged by the grading means 25 and is stored in an intermediate silo 29 as shown by the arrow 31. The discharge of the silo 29 is provided with a metering discharge means 30 in conjunction with the conveyor means 4 for delivery to the system A. Also discharging into the conveyor means 4 is a discharge line 32 of the product ground to meal fineness in the vibration grinding mill 28, namely, hard rock constituents such as quartz, granite, or basalt. Dust from the filter 23 is likewise admitted into the intermediate silo 29 through the conduit 33.

The material comminuted and dried in the system B is introduced by means of the conveyor means 4 into the exhaust gas conduit 7 leading from the cyclone heat exchanger 6 to the cyclone heat exchanger 5. The material is heated to a temperature of approximately 300° C. in a first heat exchange at gas temperatures, for example, of about 750° C. and after separation from the gas stream is introduced through the material conduit line 9 into the kiln exhaust conduit 8 leading from the inlet housing 11 of the rotary tubular kiln 12. The gas flowing in the conduit 8 has, for example, a temperature of about 1100° C. and heats the preheated material to about 700° C. After separation in the cyclone heat exchanger 6, the material heated in this fashion is introduced through the material conduit 10 into the inlet housing 11 of the rotary tubular kiln 12. Exhaust gas separated from the heated material at a temperature of about 500° to 550° C. is introduced from the cyclone heat exchanger 5 into the system B as a drying gas through the gas conduit 3 and the caloric content of the gas is utilized therein for drying the introduced raw materials from elements 14, 15 and 16.

If, instead of a calcining unit 1 which comprises a suspension-type preheater, a long rotary tubular kiln 12' of an earlier type is present, the method can be modified such that comminuted, granular material is delivered by means of a conveyor means branch conduit 34 from the system part B into the kiln inlet head 11' and exhaust gas is withdrawn with a kiln exhaust conduit 8' and is conducted through the gas conduit 3 into the system B for drying the raw material mix.

A bridging or bypass conduit 35 can be disposed in the system B for short-term bridging of the output of the impact crusher 18. Closing slides or regulating valves 36 through 39 can also be provided, these blocking the gas path through the impact crusher 18 and the separator 20 in their corresponding position and enabling a direct gas path from the exhaust gas conduit 3 by means of the bridging conduit 35 and the bypass conduit 40 to the exhaust 22 and through the filter 23 to the stack 24. In this case, however, it is necessary to cool the exhaust gas during the special operating condition by means of water injection as shown by the arrow 41, particularly for the purpose of avoiding an overheating which could be harmful to the exhaust and the filter.

In addition to calcining cement, the method of the invention is also advantageously suitable for calcining products such as burnt lime, dolomite, magnesite and the like with particular advantage in calcining systems equipped with suspension-type preheaters similar to the calcining system which has been shown in the drawings by way of example. A fluidized bed kiln can also be provided, for example, instead of a rotary tubular kiln.

It should be evident that various modifications can be made to the described embodiments without departing from the scope of the present invention.

We claim as our invention:

1. A method for the thermal treatment of mineral raw materials containing calcium carbonate and the like for the production of a calcined product which comprises:
    crushing and homogenizing said raw materials while still in the pit-wet condition to individual particles having a particle size below 200 mm,
    drying the resulting particles with hot gases from a subsequent calcining zone,
    thereafter crushing, grading, and drying the particles,
    preheating said particles at a particle size of from 1 mm to 25 by direct heat exchange with hot gases while in suspension therein,
    calcining the preheated particles in said calcining zone, under conditions of rapid heating sufficient to cause the carbonate containing materials to burst, resulting in the modification of their crystal lattices, expulsion of the water of crystallization, and ultimately to the expulsion of carbon dioxide,
    sintering the calcined materials,
    cooling the sintered materials, and
    adjusting the mean grain size of said particles sent to preheating in response to their free lime content, the the grain size being decreased as the calcined product has a higher free lime content.

2. A method according to claim 1 wherein said hot gases are derived from said calcining zone.

3. A method according to claim 1 wherein said raw materials being preheated have a particle size of from 1 mm to 4 mm.

4. A method according to claim 1 in which said raw materials are graded and separated into fractions having different grain sizes prior to preheating.

5. A method according to claim 4 wherein a fraction of hard mineral material ground to the fineness of meal is added to the other materials prior to preheating.

6. A method according to claim 5 wherein said fraction of hard mineral material is derived as a result of passing through a crusher and then ground to the fineness of meal.

7. A method according to claim 1 wherein said raw materials include at least some natural cement such as pozzuolana.

8. A method for the thermal treatment of mineral raw materials containing calcium carbonate and the like for the production of a calcined product which comprises:
    crushing and homogenizing said raw materials while still in the pit-wet condition to individual particles having a particle size below 200 mm,
    drying the resulting particles with hot gases from a subsequent calcining zone,
    thereafter crushing, grading, and drying the particles,
    preheating said particles at a particle size of from 1 mm to 25 by direct heat exchange with hot gases while in suspension therein,
    calcining the preheated particles in said calcining zone, under conditions of rapid heating sufficient to cause the carbonate containing materials to burst, resulting in the modification of their crystal lattices, expulsion of the water of crystallization, and ultimately to the expulsion of carbon dioxide,
    sintering the calcined materials,
    cooling the sintered materials, and
    adjusting the mean grain size of said particles sent to preheating in response to the amount of ignition loss in the product produced, the grain size being decreased as the ignition loss increases.

* * * * *